United States Patent
Permanne

(10) Patent No.: US 6,411,869 B2
(45) Date of Patent: Jun. 25, 2002

(54) POWER MARGIN INDICATOR FOR A ROTARY WING AIRCRAFT, PARTICULARLY A HELICOPTER

(75) Inventor: Alain Permanne, Velaux (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 09/814,956

(22) Filed: Mar. 23, 2001

(30) Foreign Application Priority Data

May 17, 2000 (FR) .............................................. 00 06270

(51) Int. Cl.⁷ ................................................. G06F 7/00
(52) U.S. Cl. ......................... 701/3; 701/14; 244/17.11; 340/778
(58) Field of Search ................. 701/3, 4, 14; 73/178 H, 73/178 T; 340/945, 946, 963, 978; 244/17.11, 53 R

(56) References Cited

U.S. PATENT DOCUMENTS 4,034,605 A * 7/1977 Green ...................... 73/178 H
5,908,485 A * 6/1999 Germanetti ............... 73/178 H
6,195,598 B1 * 2/2001 Bosqui et al. .................. 701/3

FOREIGN PATENT DOCUMENTS

FR  2756256   5/1998
WO  9626472   8/1996

OTHER PUBLICATIONS

French Novelty Search Report dated Feb. 1, 2001.

* cited by examiner

*Primary Examiner*—Yonel Beaulieu
(74) *Attorney, Agent, or Firm*—Stevens, Davis, Miller & Mosher, LLP

(57) ABSTRACT

A power margin indicator acquires rotary wing aircraft control parameters which are used to calculate and display a power margin. This calculation takes into account the actual rotor speed and a set point value for the rotor speed in order to determine, regardless of the flight configuration, a power margin which is such that when the rotor speed drops below this set point value, the display indicates that the collective pitch should be reduced until the rotor speed returns to the set point value.

12 Claims, 4 Drawing Sheets

POWER MARGIN INDICATOR FOR A ROTARY WING AIRCRAFT, PARTICULARLY A HELICOPTER

BACKGROUND OF THE INVENTION

The present invention relates to a power margin indicator for a rotary wing aircraft, particularly a helicopter.

A power margin indicator such as this is intended to provide information about the power margin available on at least one engine and one gearbox, generally the main gearbox, of said aircraft.

DESCRIPTION OF THE PRIOR ART

Patent FR-2 756 256 in the name of the applicant discloses an indicator of this type which comprises:

- acquisition means which determine the values of parameters for the control of the engine and the gearbox;
- calculation means which, on the basis of said values of the control parameters received from said acquisition means and of limit values regarding these control parameters for various engine speeds, determine for each of said speeds a power margin, each of said power margins being determined for the corresponding engine speed with respect to a first limit which corresponds to the first of the limit values which would be reached by one of the control parameters if the power were to vary; and
- display means which display said first limits on a display screen for at least some of said speeds, which first limits are represented on a scale graduated in collective pitch equivalents and capable of scrolling past a fixed pointer which indicates the effective collective pitch, the differents in terms of collective pitch between said pointer and one of said first limits being representative of the corresponding power margin.

This known indicator therefore makes it possible, at any moment and as a synthetic overview, to display:

- the effective (current) value of the collective pitch; and
- the values of the first limits for each of the engine speeds considered.

It will be noted that, for an AEO (All Engines Operative) flight configuration in which all the aircraft engines are operative, this known indicator is in itself sufficient to allow a pilot to control the engine and the main gearbox with respect to the aforementioned limit values.

However, this known indicator is not sufficient when an aircraft comprising at least two engines is in an OEI (One Engine Inoperative) flight configuration in which at least one engine of said aircraft has failed.

What happens in this case is that as long as a conventional limit (known as the FADEC limit) defined in the known way by an engine control system of the conventional FADEC type is not reached, the power increases and the value of the current pitch (represented by the aforementioned fixed pointer) converges toward said limitation as the pilot increases the collective pitch. The rotor speed is therefore set to a nominal speed or set point speed via said engine control system. By contrast, as soon as said limit is reached, the rotor speed drops as the collective pitch increases. The known and aforementioned power margin indicator then no longer allows the aircraft to be controlled and a specific NR (rotor speed) indicator is then necessary.

In consequence, in the OEI flight configuration, two different indicators (the power margin indicator and the NR indicator) are needed to allow control. This of course presents drawbacks, in particular:

- significant bulk;
- reduced comfort for the pilot(s), because two indicators have to be monitored; and
- the need for the pilot(s) to pay extra attention, particularly in order to determine which of these two indicators is operative.

The power margin indicator disclosed by patent FR-2 756 256 is therefore unable, by itself, to allow control for all flight configurations.

SUMMARY OF THE INVENTION

The present invention relates to a power margin indicator which allows the aforementioned drawbacks to be overcome.

To this end, according to the invention, said indicator of the type comprising:

- acquisition means which determine the values of parameters for the control of the engine and the gearbox;
- calculation means which, on the basis of said values of the control parameters received from said acquisition means and of limit values regarding these control parameters for various engine speeds, determine for each of said speeds a power margin, each of said power margins being determined for the corresponding engine speed with respect to a first limit which corresponds to the first of the limit values which would be reached by one of the control parameters if the power were to vary; and
- display means which display said first limits on a display screen for at least some of said speeds, which first limits are represented on a scale graduated in collective pitch equivalents and capable of scrolling past a fixed pointer which indicates the current collective pitch, the difference in terms of collective pitch between said pointer and one of said first limits being representative of the corresponding power margin, is noteworthy in that said acquisition means also determine the values of said rotor speed, and in that said calculation means take account of said rotor speed values and of at least one rotor speed set point value to determine, regardless of the flight configuration, at least one power margin which is such that when the rotor speed drops below said set point value the corresponding first limit which is displayed by the display means indicates to the pilot of the aircraft that he should reduce the collective pitch until the rotor speed returns to said set point value.

Thus, by virtue of the invention, said power margin indicator, while having the advantages of the known and aforementioned indicator, allows the pilot to keep the rotor speed at a set point value and to do so regardless of the flight configuration, that is to say to do so both in an AEO configuration and in an OEI configuration.

In consequence, this indicator according to the invention is sufficient, in itself, to allow control in all flight configurations considered, which makes it possible to remedy the aforementioned drawbacks.

According to the invention, said rotor speed set point value which preferably corresponds to the value recommended by the aircraft flight manual:

- depends on the current flight configuration; and/or
- represents a percentage of a customary reference value which, in the known way, depends on flight parameters such as the pressure $P0$, temperature $T0$ and speed $Vi$ of the aircraft.

By way of illustration:

in the AEO flight configuration, said set point value preferably represents 100% of the reference value (NR 100%); and in the OEI flight configuration, said set point value represents, for example, between 95% and 100%, preferably 97%, of the reference value (NR 97%).

Furthermore, in one preferred embodiment, said acquisition means comprise a conventional phonic wheel mounted on said rotor to measure the value of said rotor speed. Of course, other known measurement means may also be used.

Incidentally, advantageously, for an AEO flight configuration, for which all the aircraft engines are operative, said calculation means determine and said display means display the power margins relating at least to:

the maximum transient power;

the maximum take-off power; and the maximum continuous power, all specified hereinabove.

In addition, advantageously, said calculation means determine and said display means display, in addition, a power margin which is such that the corresponding first limit represents a limit value for if one engine of the aircraft fails.

This makes it possible, during the AEO flight configuration, to obtain precise information about any later OEI flight configuration there might be so that, if an engine should fail, there is no imprecise transient phase on the display when changing from the current AEO flight configuration to an OEI flight configuration.

Furthermore, advantageously, said display means display a single marking for the torque which illustrates both the maximum take-off power and the maximum continuous power and which depends on the aircraft flight speed. The continuous limit thus obtained makes it possible to allow steady state with limited torque with no limit on time. This also allows better protection for the main gearbox by applying more realistic limits.

Incidentally, according to the invention, for an OEI flight configuration for which at least one of the aircraft engines is inoperative, said indicator is capable of indicating power margins of at least one of the following two modes:

a first mode for which the limitation is defined with respect to the super-contingency power specified hereinbelow; and a second mode for which the limitation is defined with respect to the maximum contingency power specified hereinbelow.

To do this, the indicator according to the invention additionally comprises:

automatic means for triggering said first mode when an engine failure occurs; and manual means capable of being actuated by a pilot to switch from said first mode to said second mode and vice versa.

Advantageously, for said first mode, said calculation means determine and said display means display the power margins relating at least to:

the super-contingency power with the rotor speed at the set point value for the OEI flight configuration;

the maximum contingency power with the rotor speed at the set point value for the AEO flight configuration; and the intermediate contingency power specified hereinbelow with the rotor speed at the set point value for the AEO flight configuration; and possibly the maximum contingency power with the rotor speed at the set point value for the OEI flight configuration.

In addition, advantageously, for said second mode, said calculation means determine and said display means display the power margins relating at least to:

the super-contingency power with the rotor speed at the set point value for the OEI flight configuration;

the maximum contingency power with the rotor speed at the set point value for the OEI flight configuration; and the intermediate contingency power with the rotor speed at the set point value for the AEO flight configuration.

BRIEF DESCRIPTION OF THE DRAWINGS

The figures of the appended drawing will make it easy to understand how the invention may be achieved. In these figures, identical references denote similar elements.

DESCRIPTION OF THE PREFERRED EMBODIMENT

Figure 1:
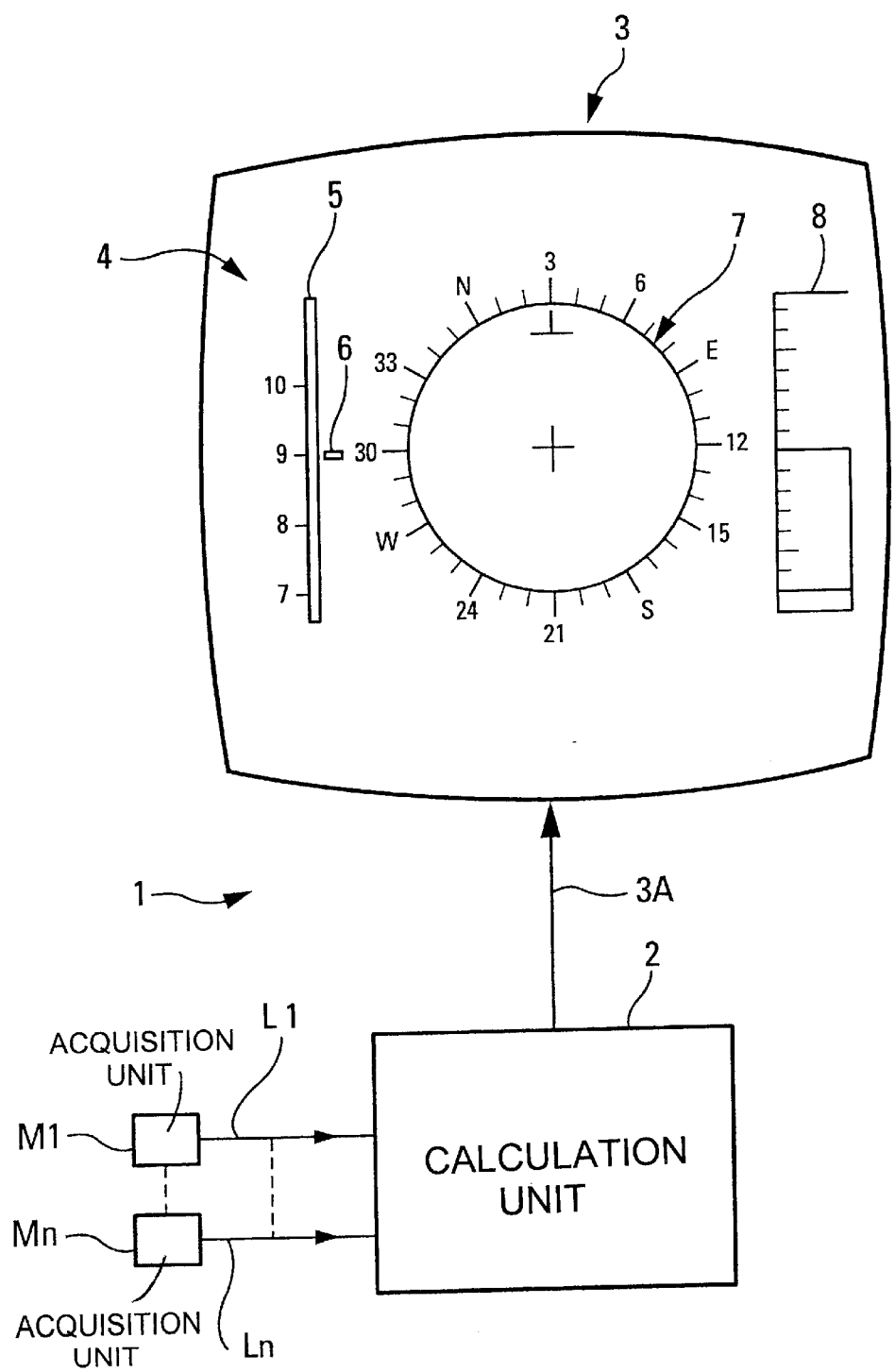
FIG. 1 schematically depicts a power margin indicator according to the invention.

The power margin indicator 1 according to the invention and depicted diagrammatically in FIG. 1 is mounted on a rotary wing aircraft, particularly a helicopter, not depicted, and is intended to provide information about the power margin available on at least one engine and one gearbox of said aircraft.

In the known way (known, for example, from patent FR-2 756 256), said power margin indicator 1 comprises:

acquisition means M1 to Mn, for example sensors or engine control systems of the FADEC type, to determine various control parameters for the engine or engines and gearbox, particularly the main gearbox, namely, in particular, the speed Ng of the gas generator, the engine torque Cm and the temperature T4 at which the gases are ejected at the entry to the free turbine;

calculation means 2 which are connected via links L1 to Ln respectively to the acquisition means M1 to Mn and which, on the basis of said values of these control parameters received from said acquisition means M1 to Mn and of limit values regarding these control parameters for various engine speeds, determine, for each of said engine speeds, a power margin, each of said power margins being determined for the corresponding engine speed with respect to a first limit corresponding to the first of the limit values that would be reached by one of the control parameters if the power were to vary; and display means 3 which are connected by a link 3A to said calculation means 2 and which display said first limits for at least some of said speeds on a display screen 4, which first limits are represented on a strip-like scale 5 graduated in the collective pitch equivalents and capable of scrolling past a fixed pointer 6 which indicates the effective (current) collective pitch, the difference in collective pitch between said pointer 6 and one of said first limits specified hereinbelow being representative of the corresponding power margin.

As can be seen in FIG. 1, said display means 3 may possibly, in a known way, display on the screen 4:

a heading rose 7; and an altimeter 8.

In addition, the visible part of the pitch scale 5 is bounded by a window, not depicted, centered with respect to the fixed pointer 6 so as to target the display on the important limits, that is to say on those which are close to said pointer 6 indicating the current collective pitch.

According to the invention, said acquisition means constantly determine, for example using a phonic wheel mounted on the rotor and not depicted, the effective current value NReff of the speed of said lift and forward travel rotor, and said calculation means 2 take account of said rotor speed values NReff and of at least one rotor speed set point value NRcons, to determine, regardless of the flight configuration, at least one power margin which is such that when the rotor speed NReff drops below, to within a predefined margin, said set point value NRcons, the corresponding first limit which is displayed by the display means 3 indicates to the pilot of the aircraft that he should reduce the collective pitch until the rotor speed returns, to within a predefined margin, to said set point value NRcons.

Figure 2:
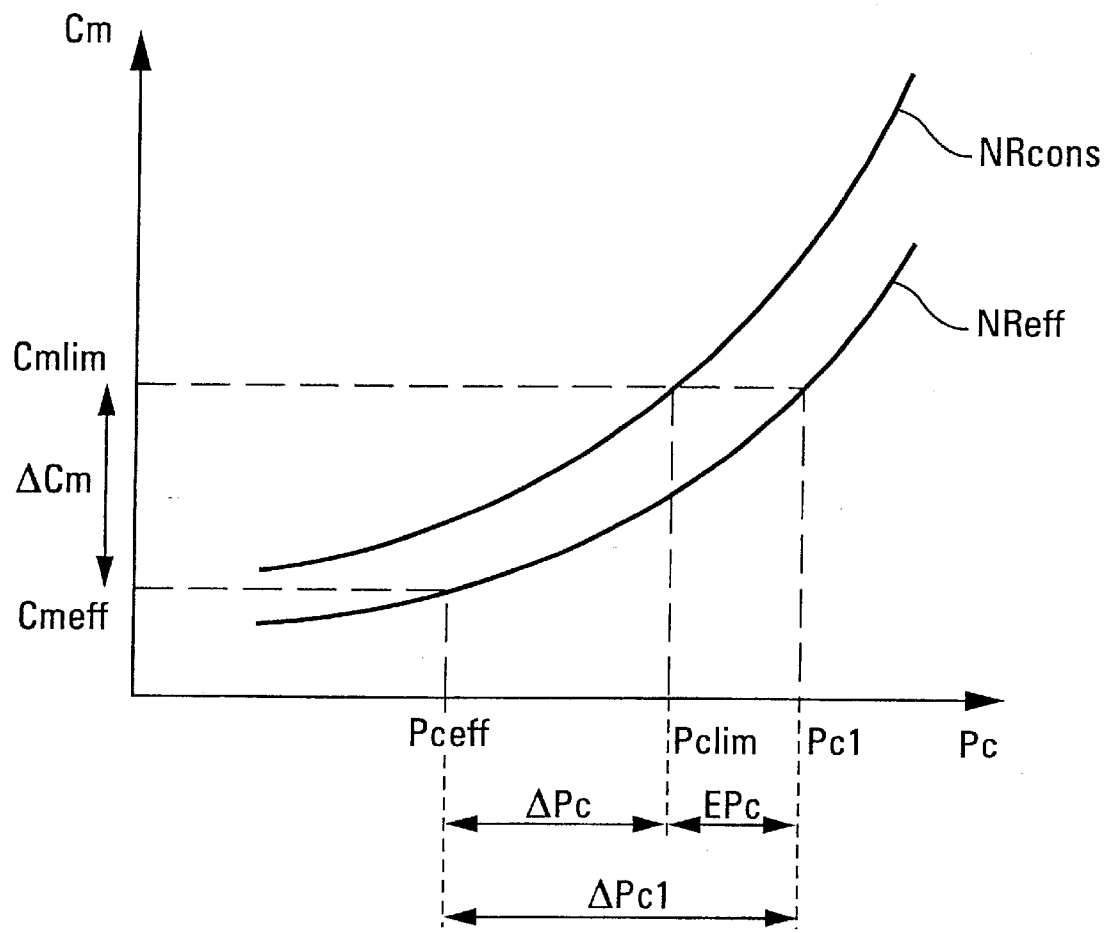
FIG. 2 is a graph illustrating the conversion between the collective pitch margin and the torque margin.

The effect of the present invention, which is obtained from the aforementioned characteristics and which, as mentioned earlier, is innovative when the rotor speed NReff diverges from the set point value NRcons, is demonstrated in FIG. 2 which illustrates a conversion graph for converting torque margin ΔCm into collective pitch margin ΔPc.

In the known way, a corresponding torque Cmeff is determined from the effective collective pitch Pceff using a known curve resulting from flight trials and defining the relationship between the torque Cm and the collective pitch Pc and which is dependent upon the rotor speed NReff.

Then, using said torque Cmeff and a limiting torque Cmlim, the torque margin ΔCm is determined.

As long as the effective speed NReff of the rotor corresponds to the set point value NRcons, a corresponding pitch margin ΔPc can be deduced from the torque margin ΔCm with ΔPc=Pclim-Pceff, for which the screen 4 displays the effective pitch Pceff with the pointer 6 and the limiting pitch Pclim as the first limit.

However, as soon as the effective speed NReff drops and diverges from the set point value NRcons (particularly when a FADEC limit is reached), a margin ΔPc1 is obtained which differs from said margin ΔPc. By virtue of the invention, as will be specified in greater detail hereinbelow, in this case the indicator 1 indicates to the pilot that he needs to reduce the pitch by a margin EPc to bring it from Pc1 to at least Pclim so as to return the effective speed NReff to the set point value NRcons.

Thus, by virtue of the invention, said power margin indicator 1, while displaying the advantages of the known and aforementioned indicator, allows the pilot to keep the effective rotor speed NReff on a set point value NRcons and to do so irrespective of the flight configuration, that is to say to do so both for an AEO configuration in which all the aircraft engines are operative and for an OEI configuration in which at least one of the engines of said aircraft is inoperative.

In consequence, this indicator 1 according to the invention is sufficient, in itself, to allow control in all flight configurations considered.

According to the invention, said set point value NRcons for the rotor speed, which preferably corresponds to the value recommended by the aircraft flight manual:

depends on the current flight configuration; and/or represents a percentage of a customary reference value which depends on flight parameters such as the pressure P0, the temperature T0 and the speed Vi of the aircraft.

By way of illustration:

in the AEO flight configuration, said set point value preferably represents 100% of the reference value (NR 100%); and in the OEI flight configuration, said set point value represents, for example, between 95% and 100%, preferably 97%, of the reference value (NR 97%).

The various possible speeds for the AEO and OEI flight configurations are specified hereinbelow.

First of all, regarding the AEO flight configuration, it is known that the thermal limits both on the engine and on the main gearbox allow three main engine usage speeds to be defined:

a take-off speed that can be used for five to ten minutes and corresponds to a level of torque for the gearbox and to a heating for the engine turbine that are permissible for a limited length of time without notable damage: this is then referred to as the maximum take-off power (PMD);

a maximum continuous speed for which the capabilities of the gearbox and those resulting from the maximum permissible heating past the high-pressure blading of the first stage of the turbine are never, at any moment, exceeded: this is the maximum continuous power (PMC); and a maximum transient speed limited to one or two tenths of a second, sometimes protected by a set limit: this is then referred to as the maximum transient power (PMT).

Secondly, there are also additional contingency power ratings on multi-engine craft, used in the event of a failure of one engine (OEI flight configuration), namely:

a contingency speed for which the capabilities of the gearbox on the input stages and the thermal capabilities of the engine are used to the maximum: this is referred to as the super-contingency power (PSU or OEI30") that can be used for thirty consecutive seconds, at most, and three times during a flight. The use of the OEI30" entails the engine being demounted and overhauled;

a contingency speed for which the capabilities of the gearbox on the input stages and the capabilities of the engine are used to very great effect; this is then referred to as the maximum contingency power (PMU or OEI2') that can be used for two minutes after OEI30" or for two minutes thirty seconds consecutively, at most; and a contingency speed for which the capabilities of the gearbox on the input stages and the thermal capabilities of the engine are used without damage; this is referred to as the intermediate contingency power (PIU or OEIcont) that can be used for between thirty minutes and two hours (depending on the engines) continuously for the remainder of the flight after the engine failure.

The engine manufacturer establishes, by calculation or testing, the curves of the available power of a turbine engine as a function of altitude and temperature and does so for each of the aforementioned six speeds.

Figure 3:
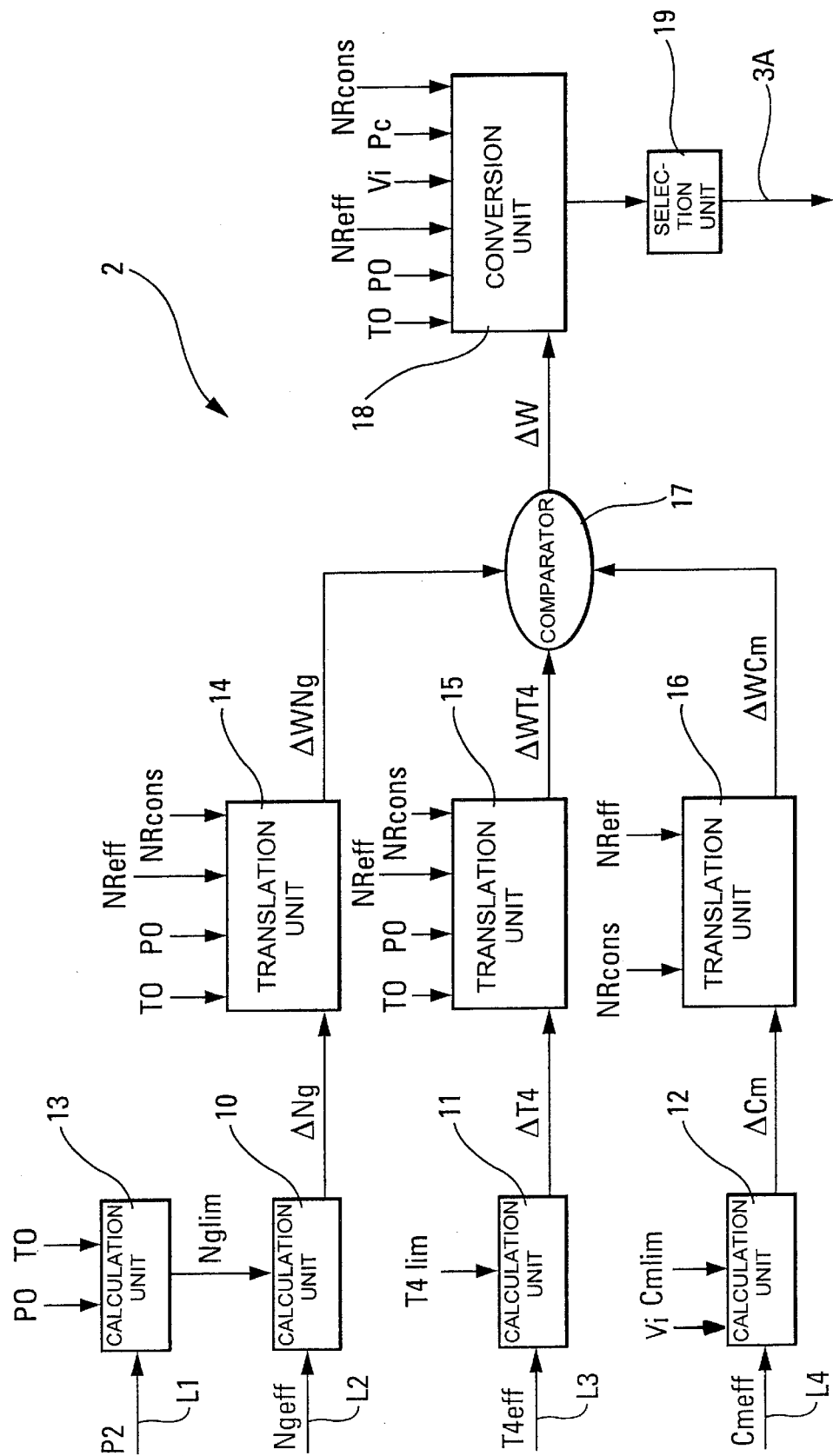
FIG. 3 is a block diagram illustrating the calculation principle according to the invention.

The principle of calculating, according to the invention, a first limit expressed in terms of collective pitch is illustrated in FIG. 3. The example of FIG. 3 shows the calculation employed in the calculation means 2. Such a calculation has to be repeated for each of the various aforementioned engine speeds.

According to the invention, the effective value Ngeff, Cmeff, T4eff of each of the three control parameters (the speed of the gas generator Ng, the engine torque Cm and the temperature T4 of ejection of gases at the entry to the free turbine) is compared with its limit Nglim, Cmlim and T4lim. These limits, which are customary, depend, in the known way, on the engine speeds considered. The limit Nglim also depends on the pressure P0, the temperature T0 and the air tapping P2.

For this purpose, the margins ΔNg, ΔT4 and ΔCm are calculated at 10, 11 and 12 respectively, said margins satisfying the following relationships:

ΔNg=Nglim−Ngeff, Nglim being calculated at 13,

ΔT4=T4lim−T4eff,

ΔCm=Cmlim−Cmeff.

These margins ΔNg, ΔT4 and ΔCm are translated into power margins ΔWNg, ΔWT4 and ΔWCm at 14, 15 and 16 respectively, that is to say that they are translated into margins which have the same unit, so that they can be compared at 17 in order to deduce which of them has the lowest power margin ΔW.

The latter is converted at 18 into a collective pitch margin. From this collective pitch margin ΔPc and the effective collective pitch Pceff (indicated by the pointer 6) there is obtained, expressed in collective pitch equivalents, the first limit corresponding to the engine speed considered, namely, in particular:

limPMT in the case of the PMT speed;

limPMD in the case of the PMD speed;

limPMC in the case of the PMC speed;

limPSU in the case of the PSU speed;

limPMU in the case of the PMU speed; and limPIU in the case of the PIU speed.

At 19, the first limit or limits to be displayed on the scale 5 are chosen, as will be seen hereinbelow, particularly according to the flight configuration (AEO, OEI, etc.) and speed Vi of the aircraft.

FIG. 3 additionally shows the various parameters (T0, P0, NReff, NRcons, Vi, Pc) taken into consideration in the various stages 13, 14, 15, 16, 18 for calculation. These parameters are received via links Ln not expressly depicted for reasons of simplifying the drawing.

On the basis of the aforesaid characteristics, the display means 3 display, on the scale 5 on the screen 4, indications 20, 21 and 22 depicted respectively in FIGS. 4, 5 and 6 and corresponding respectively to an AEO mode, to a first OEI mode and to a second OEI mode, which modes are specified hereinbelow.

Figure 6:
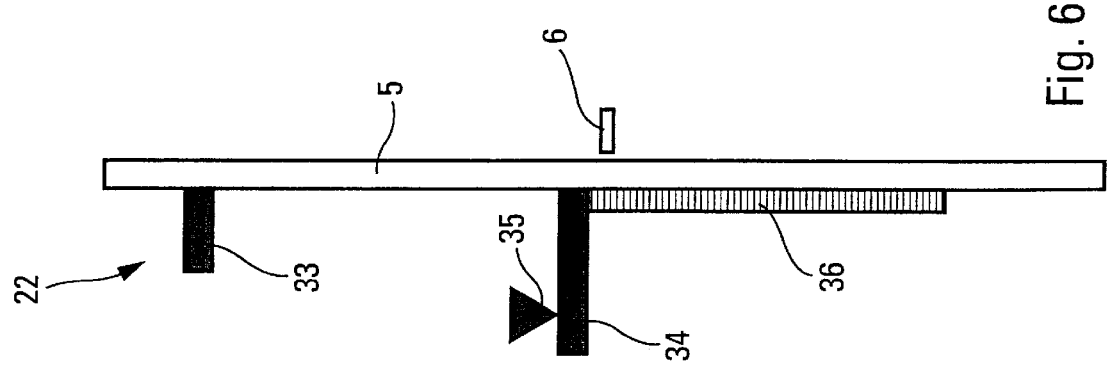
FIGS. 4 to 6 show the displays according to the invention for various respective flight configurations.
Figure 5:
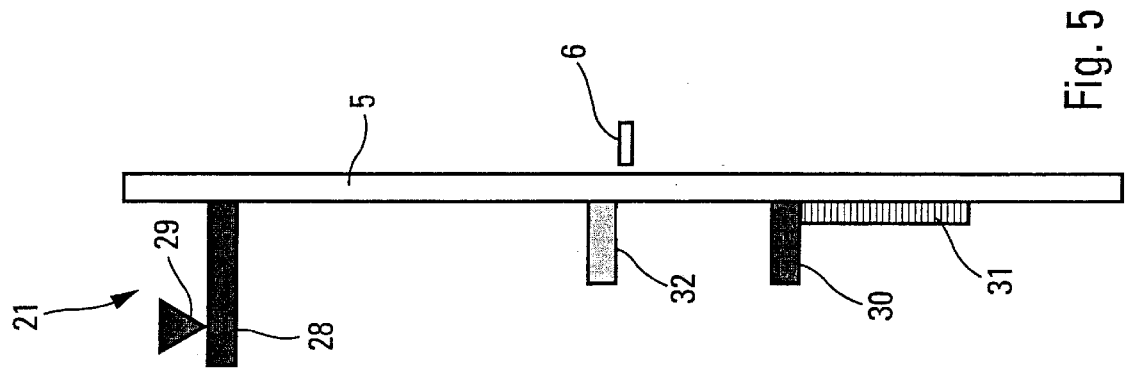
Figure 4:
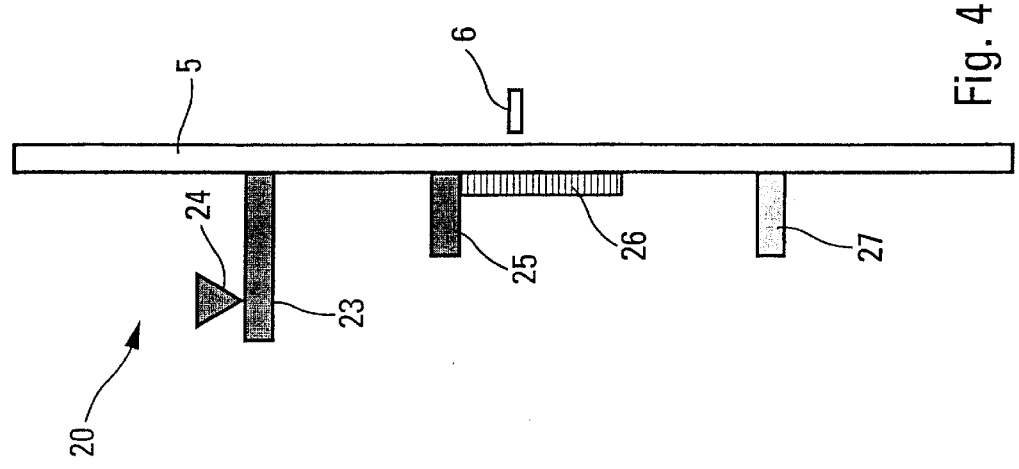

For reasons of simplifying the drawing, the graduations of the scale 5 are not depicted in these FIGS. 4 to 6.

As can be seen in FIG. 4, for an AEO flight configuration, the display means 3 show:

a long section 23, for example red, and a luminous means 24, for example a light-emitting diode;

a short section 25, for example red; and an elongate zone 26, preferably orange, to show the respective relative power margins:

at maximum transient power (PMT);

at maximum take-off power (PMD); and at maximum continuous power (PMC).

The means 3 additionally display a section 27 (blue) which indicates a power margin which is such that the corresponding first limit represents a limit value for the scenario in which the aircraft engine develops a fault.

This makes it possible during the AEO flight configuration to obtain precise information about any possible subsequent OEI flight configuration there might be so that, in the event of an engine failure, there is no imprecise transient phase in the display when switching from the AEO flight configuration to the OEI flight configuration.

Furthermore, advantageously, when the aircraft is on the torque limit, said display means 3 present a unique marking for torque, which illustrates both the maximum take-off power and the maximum continuous power and which depends on the flight speed of the aircraft. The continuous limit thus obtained makes it possible to authorize hovering flight with torque limitation with no limitation on time. This in addition allows better protection of the main gearbox by providing more realistic limits.

Furthermore, according to the invention, for an aircraft having at least two engines, in the case of the OEI flight configuration for which at least one of the engines of said aircraft is inoperative, said indicator 1 is capable of indicating the power margins of at least one of the following two modes:

a first mode 21 (or OEI High with the FADEC limit adjusted or set to the OEI30" speed), for which the limit is defined with respect to the super-contingency power (FIG. 5); and a second mode 22 (or OEI Low with the FADEC limit adjusted to the OEI2' speed), for which the limit is defined with respect to the maximum contingency power (FIG. 6).

It will be noted that the speed chosen for displaying the section 27 (FIG. 4) depends on the flight speed Vi of the aircraft. More specifically:

at low speed, said first mode 21 is needed to achieve performance; and at high speed, said second mode 22 will suffice to allow a flight in complete safety. In this case, there is no need to use said first mode 21.

As can be seen in FIG. 5, for said first mode 21, the display means 3 show:

a long section 28 (red) and a display means 29 (diode);

a short section 30 (red); and an elongate zone 31 (orange), to show the respective relative power margins:

at the super-contingency power (PSU) with the rotor speed at the set point value for the OEI flight configuration (for example NR 97%);

at the maximum contingency power (PMU) with the rotor speed at the set point value for the AEO flight configuration (NR 100%); and at the intermediate contingency power (PIU) with the rotor speed at the set point value for the AEO flight configuration (NR 100%).

The means 3 additionally display a short section 32 (blue) indicating the power margin relative to the maximum contingency power (PMU) with the rotor speed at the set point value for the OEI flight configuration (NR 97%).

The latter marking eases the visual transition when changing from set limits, that is to say when switching from said first mode 21 to said second mode 22. This marking 32 can be eliminated if it is very close to the section 30.

It will be noted that the elongate zone 31 corresponds to the start of countdown for the use of said second mode.

Finally, for said second mode 22, said means 3 display:

a short section 33 (red);

a long section 34 (red) and a display means 35 (diode); and an elongate zone 36 (orange), to show the respective relative power margins:

at the super-contingency power (PSU) with the rotor speed at the set point value for the OEI flight configuration (NR 97%);

at the maximum contingency power (PMU) with the rotor speed at the set point value for the OEI flight configuration (NR 97%); and at the intermediate contingency power (PIU) with the rotor speed at the set point value for the AEO flight configuration (NR 100%).

Furthermore, the power margin indicator 1 according to the invention additionally comprises:

automatic means, not depicted, for triggering said first mode 21 when the aircraft experiences an engine failure; and manual means, also not depicted, capable of being actuated by a pilot of the aircraft, to switch from said first mode 21 to said second mode 22, and vice versa.

The latter means preferably act, at 19, on the processing mode of FIG. 3.

What is claimed is:

1. A power margin indicator for a rotary wing aircraft comprising at least one main lift and forward travel rotor, said indicator, which is intended to provide information about a power margin available on at least one engine and at least one engine and at least one gearbox of said aircraft, comprising:

acquisition means which determine values of control parameters for control of the at least one engine and the at least one gearbox;

calculation means which, on the basis of said values of the control parameters determined by said acquisition means and of limit values regarding said control parameters for various engine speeds of said at least one engine, determines for each of said engine speeds a power margin, each said power margin being determined for a corresponding one of said engine speeds with respect to a first limit which corresponds to a first one of the limit values which would be reached by one of the control parameters if the power were to vary; and display means which display said first one of said limit values on a display screen for at least some of said engine speeds, said first one of said limit values being represented on a scale that is graduated in collective pitch equivalents and capable of scrolling past a fixed pointer which indicates a current collective pitch, a difference in terms of collective pitch between said pointer and said first one of said limit values being representative of a corresponding power margin, wherein said acquisition means determine values of a speed of said rotor, and wherein said calculation means take account of said values of said speed of said rotor and of at least one rotor speed set point value to determine, regardless of flight configuration, at least one power margin which is such that when the speed of said rotor drops below said set point value, the corresponding first one of said limit values which is displayed by the display means indicates to a pilot of the aircraft that the collective pitch should be reduced until the speed of said rotor returns to said set point value.

2. The indicator as claimed in claim 1, wherein said set point value depends on the flight configuration.

3. The indicator as claimed in claim 1, wherein said set point value represents a percentage of a reference value which depends on flight parameters of said aircraft.

4. The indicator as claimed in claim 1, wherein said acquisition means comprise a phonic wheel mounted on said rotor to measure the values of said speed of said rotor.

5. The indicator as claimed in claim 1, wherein said at least one engine includes a plurality of engines and, for an ABO flight configuration, for which all the plurality of engines are operative, said calculation means determine and said display means display power margins relating at least to:

maximum transient power;

maximum take-off power; and maximum continuous power.

6. The indicator as claimed in claim 5, wherein said calculation means determine and said display means further display a power margin which is such that a corresponding first one of said limit values represent a limit value for a situation wherein at least one of said plurality of engines fails.

7. The indicator as claimed in claim 1, wherein said display means display a single marking for torque, said marking illustrating both maximum take-off power and maximum continuous power and being dependent on flight speed of the aircraft.

8. The indicator as claimed in claim 1, said at least one engine includes a plurality of engines and wherein, for an OEI flight configuration for which at least one of the plurality of engines is inoperative, said indicator is capable of indicating power margins of at least one of:

a first mode for which a limitation is defined with respect to sugar-contingency power; and a second mode for which a limitation is defined with respect to maximum contingency power.

9. The indicator as claimed in claim 8, which further comprises automatic means for triggering said first mode when a failure of one of said plurality of engines occurs and manual means capable of being actuated by a pilot of said aircraft to switch from said first mode to said second mode and vice versa.

10. The indicator as claimed in claim 8, wherein, for said first mode, said calculation means determine and said display means display power margins relating at least to:

the super-contingency power with the speed of said rotor at the set point value for the OEI flight configuration;

the maximum contingency power with the speed of said rotor at the set point value for an AEO flight configuration; and the intermediate contingency power with the speed of said rotor at the set point value for the AEO flight configuration.

11. The indicator as claimed in claim 10, wherein said calculation means determine and said display means display a power margin relating to the maximum contingency power with the speed of said rotor at the set point value for the OEI flight configuration.

12. The indicator as claimed in claim 8, wherein, for said second mode, said calculation means determine and said display means display power margins relating at least to:

the super-contingency power with the speed of said rotor at the set point value for the OEI flight configuration;

the maximum contingency power with the speed of said rotor at the set point value for the OEI flight configuration; and the intermediate contingency power with the speed of said rotor at the set point value for the AEO flight configuration.

* * * * *